United States Patent
De Boer et al.

(10) Patent No.: US 7,250,933 B2
(45) Date of Patent: Jul. 31, 2007

(54) ELECTROPHORETIC DISPLAY DEVICE

(75) Inventors: Dirk Kornelis Gerhardus De Boer, Eindhoven (NL); Mark Thomas Johnson, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 530 days.

(21) Appl. No.: 10/223,313

(22) Filed: Aug. 19, 2002

(65) Prior Publication Data
US 2003/0038772 A1  Feb. 27, 2003

(30) Foreign Application Priority Data
Aug. 23, 2001 (EP) ................... 01203176

(51) Int. Cl.
*G09G 3/34* (2006.01)
(52) U.S. Cl. .................... 345/107; 345/55; 345/103
(58) Field of Classification Search ........ 345/103–107, 345/204–215, 74.1–77, 55, 75.2; 359/296
See application file for complete search history.

(56) References Cited

U.S. PATENT DOCUMENTS

| | | | | |
|---|---|---|---|---|
| 6,017,584 A | 1/2000 | Albert et al. | ............ | 427/213.3 |
| 6,144,361 A | 11/2000 | Gordon, II et al. | ......... | 345/107 |
| 6,621,541 B1 * | 9/2003 | Choi | .......................... | 349/113 |
| 2002/0180688 A1 * | 12/2002 | Drzaic et al. | ............... | 345/107 |

FOREIGN PATENT DOCUMENTS

WO  WO9953373  10/1999

OTHER PUBLICATIONS

Patent Abstracts of Japan, Hanji Motoyasu: "Electrophoretic Display Device," Publication No. 01137240, May 30, 1989, Application No. 62296379, Nov. 25, 1987.

* cited by examiner

*Primary Examiner*—Vijay Shankar
(74) *Attorney, Agent, or Firm*—Paul Im (57) ABSTRACT

Color selection and grey values are obtained in electrophoretic displays causing pixels, which have a main reservoir (16) surrounded by auxiliary reservoirs (18) for the primary colors and an entrance electrode (13), to move particles to the main display area and further electrodes (14, 26, 27) for grey value selection.

16 Claims, 5 Drawing Sheets

ELECTROPHORETIC DISPLAY DEVICE

BACKGROUND OF THE INVENTION (1) Field of the Invention

The invention relates to an electrophoretic display device comprising at least a pixel with an electrophoretic medium in a main reservoir comprising at least one electrode, and means via which the pixel can be brought to different optical states. Where an exemplary switching electrode is mentioned in this application, it may be divided, if desired, into a plurality of sub-electrodes which are fed with one and the same voltage externally or via switching elements.

(2) Description of the Related Art

Electrophoretic display devices are based on the movement of charged, usually colored particles under the influence of an electric field between two extreme states having a different light transmissivity or light reflection. With these devices, dark (colored) characters can be imaged on a light (colored) background, and vice versa.

Electrophoretic display devices are therefore notably used in display devices taking over the function of paper, referred to as the "paper white" applications (electronic newspapers, electronic diaries).

In the known electrophoretic display devices with an electrophoretic medium between two switching electrodes, the switching electrodes are provided with drive voltages. In this case, the pixel can be brought to only two extreme optical states. One of the switching electrodes is then realized, for example, as two mutually interconnected narrow conducting strips on the upper side of a display element. In the case of a positive voltage across this switching electrode with respect to a bottom electrode, which covers the entire bottom surface of the display element, particles (which are negatively charged in this example) move towards the potential plane which is defined by the two interconnected narrow conducting strips. The (negatively) charged particles spread across the front surface of the display element (pixel) which then assumes the color of the charged particles. In the case of a negative voltage across the switching electrode with respect to the bottom electrode, the (negatively) charged particles spread on the bottom surface so that the display element (pixel) assumes the color of the liquid.

In practice there is an ever increasing need of displaying intermediate optical states (referred to as grey values). Known methods of introducing grey values are usually inadequate. For example, electrophoretic display devices are too slow to introduce grey values via time-weighted drive periods (time ratio grey scale). Division of the pixel into different surfaces (area ratio grey scale) usually requires barriers between the different sub-pixels so as to prevent mutual crosstalk.

Moreover, the number of electrodes required for the drive strongly increases in multicolor display devices.

BRIEF SUMMARY OF THE INVENTION

The present invention envisages to solve this problem. In an electrophoretic color display device according to the invention, grey values (intermediate optical states) are obtained by providing the pixel with at least one auxiliary reservoir and at least one further electrode, and drive means for displacing electrophoretic particles from the auxiliary reservoir to the main reservoir via electric voltages.

The invention is based on the recognition that the electric field within a display cell can be influenced by means of electric voltages on the electrode or electrodes and possibly a further electrode in such a way that the (negatively) charged particles move only to a part of the visible surface, while moreover the supply from one or more auxiliary reservoirs (with electrophoretic particles of different colors) can be influenced by means of an electric field generated with the aid of the electrode or electrodes and the further electrode or electrodes. Dependent on the electric voltages across the electrodes and the further electrodes, a larger or smaller quantity of particles moves to the surface and different intermediate optical states (grey values) are obtained.

The color display device may be provided with, for example, a color filter, but a pixel may alternatively comprise a plurality of types of electrophoretic particles or auxiliary reservoirs (with electrophoretic particles of different colors).

The invention is further based on the recognition that different intermediate optical states can be obtained for each composite color when using electrophoretic particles for different colors with a different mobility via a suitable pulse pattern on the further electrodes.

To obtain a satisfactory distribution on the surface between the two electrodes in the case of a change of adjustment, it is preferred to spread the charged particles in advance in a uniform manner across the other electrode, for example, by bringing the pixel, prior to selection, to a defined state (for example, by giving it a reset pulse), if necessary, in combination with a small alternating field component.

In a first embodiment, the pixel, viewed from a direction transverse to a main surface of the display device, comprises auxiliary reservoirs along at least two sides of the main reservoir. Since the auxiliary reservoir is now common for a plurality of (rows of) pixels, a larger aperture is obtained.

In a display device for multicolor display, the electrophoretic particles of different colors may be displaced, for example, selectively from an auxiliary reservoir to the main reservoir, for example, when electrophoretic particles of a different mobility are used.

It may also be desirable to fix the electrophoretic particles. In a further embodiment, the electrophoretic display device is therefore provided with means for generating an electric field transverse to the direction of displacement of the electrophoretic particles between the main reservoir and an auxiliary reservoir. A mechanical separation may be alternatively provided between the main reservoir and an auxiliary reservoir.

To fix an adjusted grey value, the electrophoretic particles and at least a wall of the main reservoir may have the capability of mutual adhesion.

These and other aspects of the invention are apparent from and will be elucidated with reference to the embodiments described hereinafter.

BRIEF DESCRIPTION OF THE DRAWING

In the drawings:

FIG. 9 is a cross-sectional view of how different grey values can be realized in a color display device by using the principle of FIG. 8, while

DETAILED DESCRIPTION OF THE INVENTION

The Figures are diagrammatic and not drawn to scale; corresponding parts are generally denoted by the same reference numerals.

Figure 1:
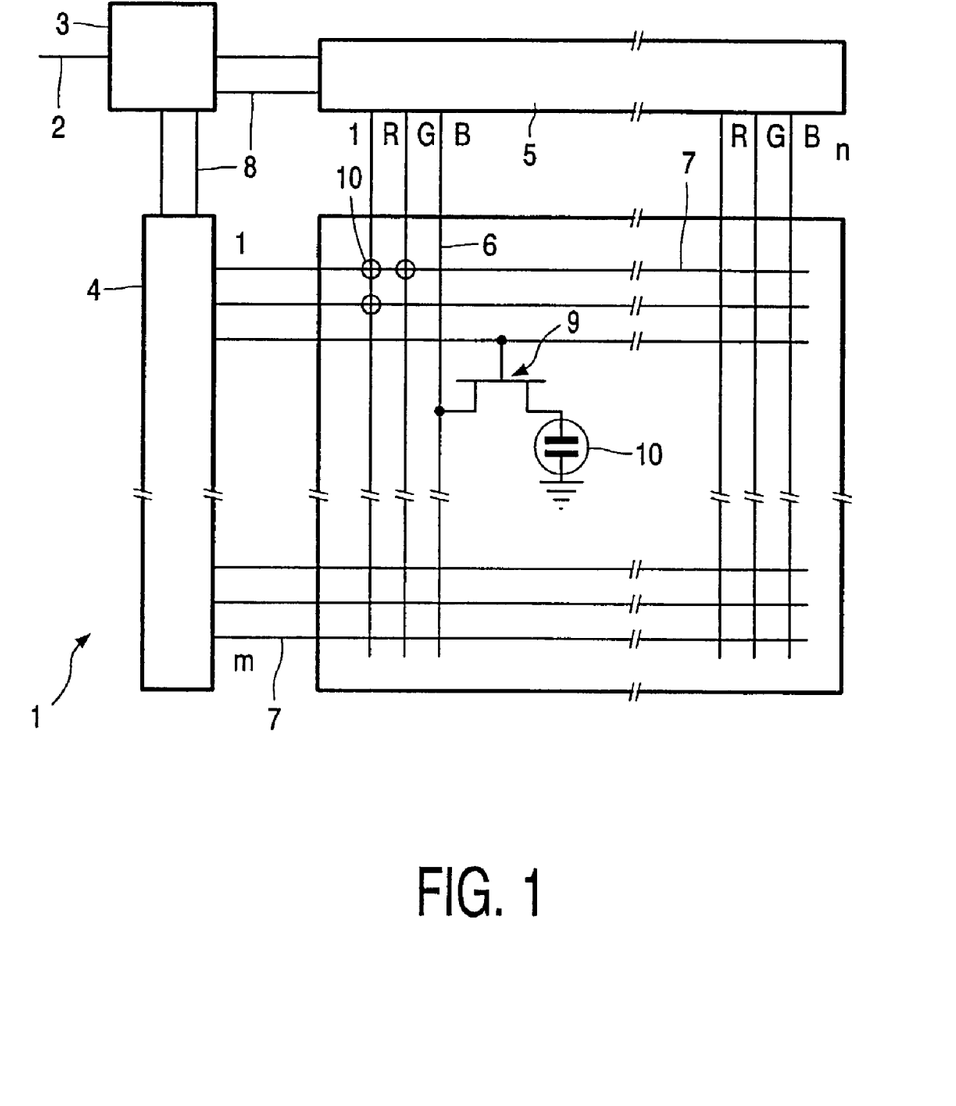
FIG. 1 is an electrical equivalent of a part of a color display device.

FIG. 1 is an electrical equivalent of a part of a color display device 1 to which the invention is applicable. It comprises a matrix of pixels 10 at the area of crossings of row or selection electrodes 7 and column or data electrodes 6. The row electrodes 1 to m are consecutively selected by means of a row driver 4, while the column electrodes 1 to n are provided with data via a data register 5. The pixels in columns 1, 4, 7, . . . , n−2 constitute red pixels in this example, the pixels in columns 2, 5, 8, . . . , n−1 constitute blue pixels and the pixels in columns 3, 6, 9, . . . , n constitute green pixels. To this end, incoming data 2 are first processed, if necessary, in a processor 3. Mutual synchronization between the row driver 4 and the data register 5 takes place via drive lines 8.

Drive signals from the row driver 4 and the data register 5 select a pixel 10 (referred to as passive drive). In known devices, a column electrode 6 receives such a voltage with respect to a row electrode 7 that the pixel at the area of the crossing is in one of two extreme states (for example, black or colored, dependent on the colors of the liquid and the electrophoretic particles).

If desired, drive signals from the row driver 4 can select the picture electrodes via thin-film transistors (TFTs) 9 whose gate electrodes are electrically connected to the row electrodes 7 and the source electrodes are electrically connected to the column electrodes 6 (referred to as active drive). The signal at the column electrode 6 is transferred via the TFT to a picture electrode of a pixel 10, coupled to the drain electrode. The other picture electrodes of the pixel 10 are connected to, for example, earth by means of, for example, one (or more) common counter electrode or electrodes. In the example of FIG. 1, such a TFT 9 is shown diagrammatically for only one pixel 10.

In a first color display device according to the invention, each pixel is provided with one or more further electrodes as will be described hereinafter, and further drive means for providing the further electrode or electrodes with electric voltages. Although the column electrodes 6 are indicated as data electrodes and the row electrodes 7 are indicated as selection electrodes, they may fulfill a different function during parts of a drive period, as will be described hereinafter, for example, they may cause electrophoretic particles to be displaced. To this end, the drive means comprise, for example, in the data register 5 (and possibly a part of the driver) extra storage means or other electronics as well as extra column electrodes (not shown) (and extra TFTs in the case of active drive).

A pixel 10 (FIGS. 2, 3) comprises a first substrate 11, for example, of glass or a synthetic material, provided with switching electrodes 12, 13, 14, and a second transparent substrate 15. According to the invention, the pixel comprises a main reservoir 16 which is filled with an electrophoretic medium, for example, a white liquid 17 and (in this example) four auxiliary reservoirs 18 for the electrophoretic liquid in which, in this example, colored positively charged electrophoretic particles, for example, red, green, blue and, if necessary, black particles are present (in FIGS. 2, 3, the auxiliary reservoirs are denoted 18R, 18G, 18B, 18Z). The pixel 10 is closed by, for example, a wall 19, while the auxiliary reservoirs 18 are covered, if necessary, with a black mask 21 on the viewing side, denoted by arrow 20.

Figure 2:
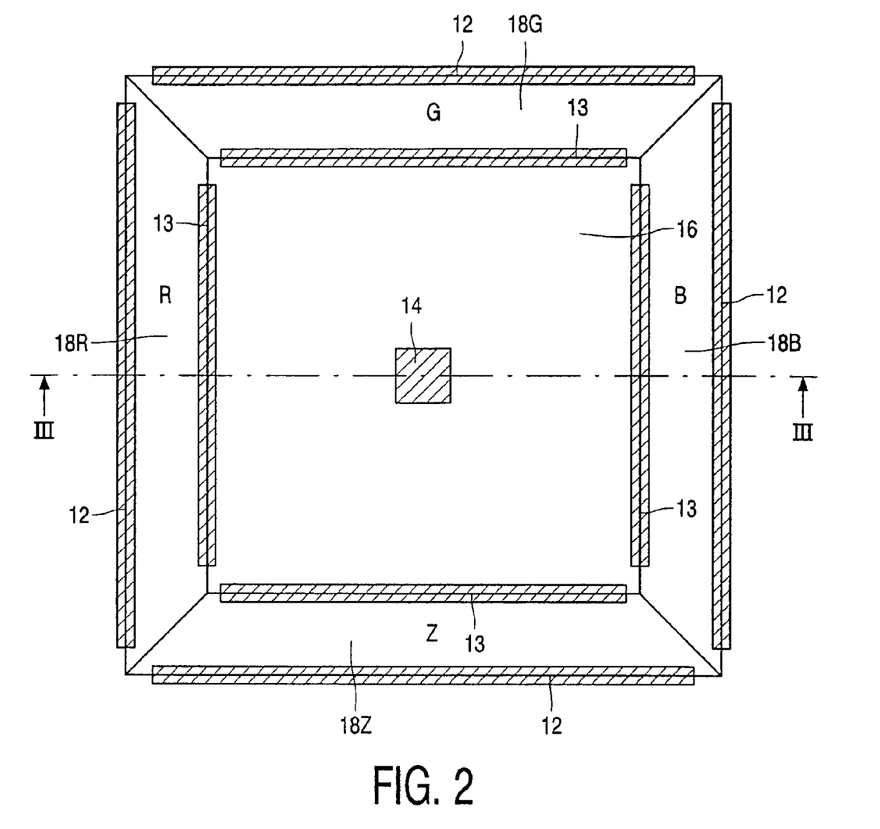
FIG. 2 is a diagrammatic plan view of a part of a color display device according to the invention.
Figure 3:
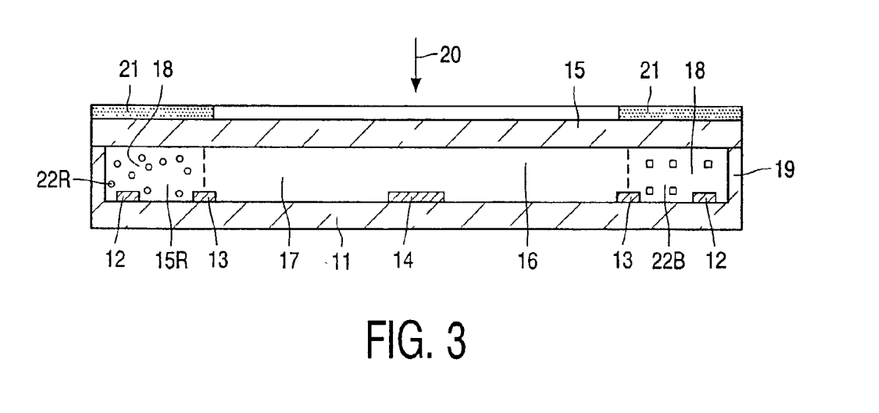
FIG. 3 is a cross-section taken on the line III—III in FIG. 2.

A full drive cycle for the device of FIGS. 1, 2, 3 comprises a number of steps. In a first step, possibly colored (or black) positively charged electrophoretic particles 22 present in the main reservoir (for example, due to a previous drive cycle) are removed from this reservoir by means of a reset voltage between the electrodes 12 and 13, which (in this example) generates a field directed towards the electrodes 13. Not only do the particles have a different color, but also a difference of mobility. For example, the red particles move faster in an electric field than the green ones and these in turn move faster than the blue ones.

For performing the reset step, a situation is first created, if necessary, in which all particles are present near the electrode 14 (this electrode then has, for example, a potential of 0, while the electrodes 13 have a potential of +V). The pixel then has a substantially white appearance.

Subsequently, the electrode 13 associated with auxiliary reservoir 18R receives a negative pulse (square-wave voltage) having an amplitude of −V, which pulse lasts long enough to cause all red particles 22R to move towards this electrode. By simultaneously or subsequently giving the electrode 12 associated with auxiliary reservoir 18R a negative voltage with respect to said electrode 13, all of the red particles 22R are stored in the auxiliary reservoir 18R.

Meanwhile, the green particles 22G have covered, for example, half the distance between the electrodes 14 and 13. When using a negative pulse (square-wave voltage) with a double duration presented to the electrode 13 associated with auxiliary reservoir 18G, and possibly positive voltages at the other electrodes 13, these particles will reach the electrode 13 associated with auxiliary reservoir 18G. By subsequently giving the electrode 12 associated with auxiliary reservoir 18G a negative voltage with respect to said electrode 13, all of the green particles 22G are stored in the auxiliary reservoir 18G in a similar manner as described above with reference to the red particles. Similarly, all of the blue particles 22B are stored in the auxiliary reservoir 18B (and, if present, the black particles 22Z in the auxiliary reservoir 18Z). It will also be apparent from the above that the requirement is imposed on the particles 22 that they should substantially not overlap as far as their (mobility) properties are concerned.

Subsequently, a positive pulse (for example, a square-wave voltage) is presented between the electrode 14 and the electrode 12 associated with one of the auxiliary reservoirs 18, for example, auxiliary reservoir 18R. Dependent on the duration and value of the pulse, a number of red particles 22R will spread across the main reservoir. The grey value for the red color in the pixel 10 is thereby defined. For the other colors, the grey values can be defined either sequentially or simultaneously with the determination of the grey value for the red color.

The adjustment of the grey values is also possible by means of only voltage pulses between the electrodes 12, 13 as associated with the different auxiliary reservoirs 18. In that case, the electrode 14 may be omitted, if desired, but the grey values can only be defined sequentially.

Since the particles do not always remain positioned on the substrate, for example, due to motion in the liquid, it may be advantageous to provide it with a sticking layer having a small adhesion.

If necessary, the grey values thus adjusted may also be fixed by means of a magnetic field or an electric field in a direction transverse to the substrates.

In practice, it may be difficult to fill the different auxiliary reservoirs 18 with particles of a single color. A solution is the use of a common auxiliary reservoir (for example, auxiliary reservoir 18Z in FIG. 2). For performing the reset step, the electrode 12 associated with auxiliary reservoir 18Z receives a negative pulse (for example, a square-wave voltage having an amplitude of −V), which lasts long enough to cause all particles 22 to move towards this electrode.

When displacing the particles from the common auxiliary reservoir to the main reservoir (or the other auxiliary reservoirs), particles of a different color must first be separated. To this end, further electrodes may be provided, if necessary, for generating potential barriers which prevent the passage of given particles (that have, for example, a higher charge than other particles). With two or three such potential barriers in series, the particles can then be mutually separated again (for example, during a part of the reset step). Since this step is the same for all pixels, the electrodes for generating potential barriers can be jointly provided for a plurality (or all) of the pixels. Other possibilities of mutually separating particles of a different color are, for example, the provision of physical barriers (for example, filters) in combination with colored particles of different dimensions or surface modifications (difference of adhesion) so that particles of one color leave the joint auxiliary reservoir more easily (or, in contrast, with greater difficulty).

Figure 4:
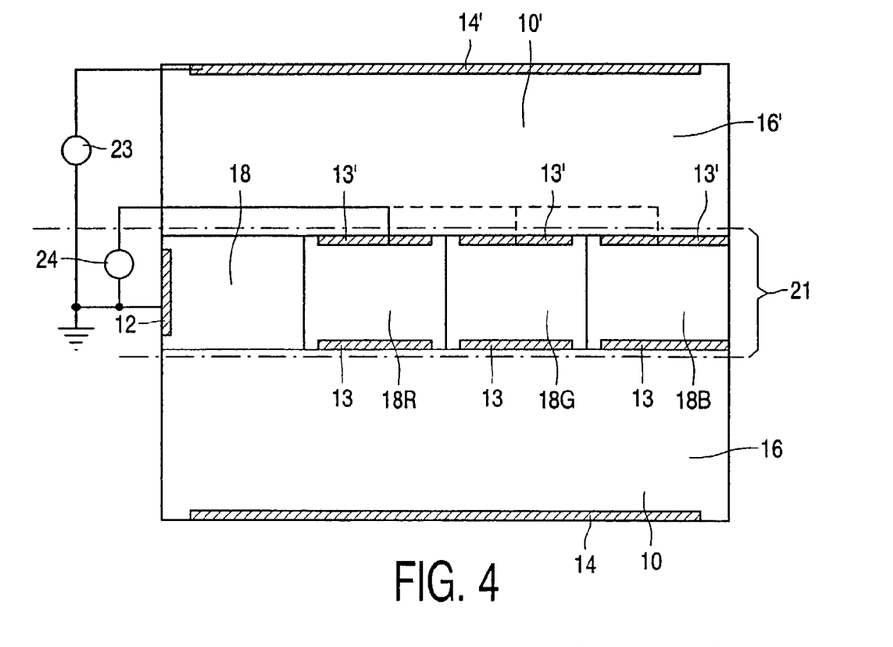
FIG. 4 is a plan view of a part of a further electrophoretic color display device according to the invention, in which different grey values (intermediate optical states) can be realized.

FIG. 4 is a plan view of two juxtaposed pixels 10, 10' with joint auxiliary reservoirs 18, 18R, 18G, 18B. During the reset step, the electrode 12 associated with auxiliary reservoir 18 receives a negative pulse with respect to the electrodes 14, 14' (by means of the voltage source 23) so as to cause all particles 22 to move towards this electrode. Subsequently, the electrodes 13 associated with auxiliary reservoirs 18R, 18G, 18B receive a negative pulse with respect to electrode 12, as described above (by means of the voltage source 24) and, possibly simultaneously or subsequently, a voltage at the electrodes 14 which is negative with respect to that at electrode 12, by means of the voltage source 23. Consequently, all of the red, green and blue particles are stored in the auxiliary reservoirs 18R, 18G, 18B, whereafter the grey values are defined again by means of, for example, voltages between the electrodes 14, 14' and the electrode 12. Color selection (determining which particles are stored in which auxiliary reservoir 18R, 18G, 18B) is effected again by generating potential barriers, mutually separating particles of a different color by providing physical barriers (for example, filters) or by means of surface modifications. The joint auxiliary reservoirs 18, 18R, 18G, 18B are covered with a black mask 21.

Figure 5:
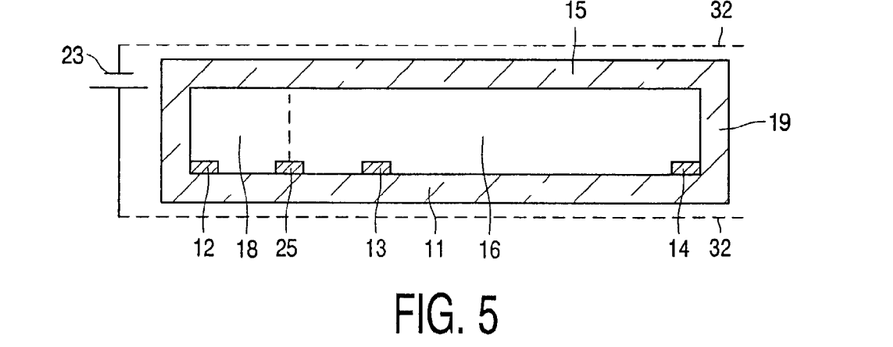
FIG. 5 is a cross-sectional view of a variant of FIG. 4.

FIG. 5 is a cross-section of another example of a pixel according to the invention, in which the auxiliary reservoirs 18, 18R, 18G, 18B are replaced by a single auxiliary reservoir 18 between the electrode 12 and a further entrance electrode 25. In this example, the operation is performed again in a reset step (a negative voltage between the electrodes 12 and 14) of causing all particles to move towards electrode 12. Subsequently, color selection takes place, in which particles of a different color have a different mobility. Dependent on the mobility and the pulse duration and pulse height of the (negative) pulse at entrance electrode 25, as described in U.S. Pat. No. 6,017,584, particles of one color move towards electrode 25, for example, first the red particles.

By a suitable choice of the voltages at the electrodes 14, 25 (dependent on the grey value to be adjusted), the desired number of particles is passed towards the visible area.

A possible surplus of particles in the visible area (the main reservoir 16) may be removed, if necessary, by applying a voltage between the electrodes 12 and 13, at which electrodes 13, 14 are held at substantially the same voltage. Subsequently, these steps (with the exception of the reset step) are repeated for the two other colors. The ultimate adjustment may be fixed, if necessary, by an electric field. This may be provided (if necessary, on a comparatively large part or on the entire display device), for example, by means of the electrodes 32 and voltage source 33.

Figure 6:
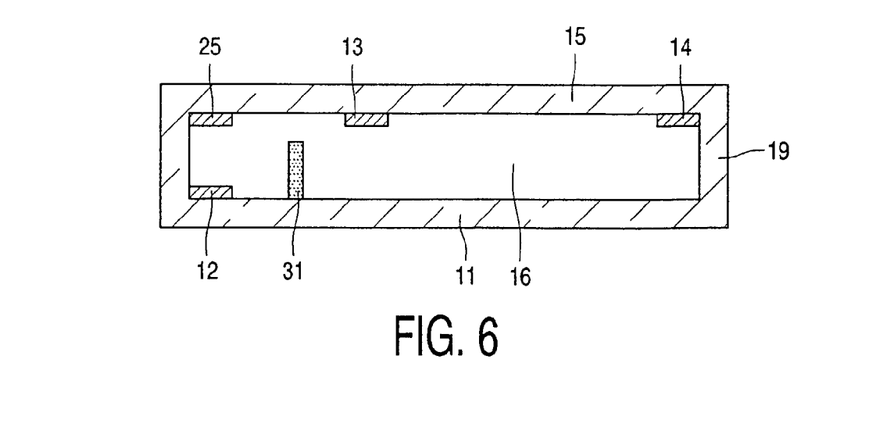
FIG. 6 is a variant of FIG. 5.

FIG. 6 is a cross-section of a variant having a physical barrier 31. Here, the color selection is realized again by means of the electrodes 12, 25, while the grey values are adjusted by means of the electrodes 13, 14.

Figure 7:
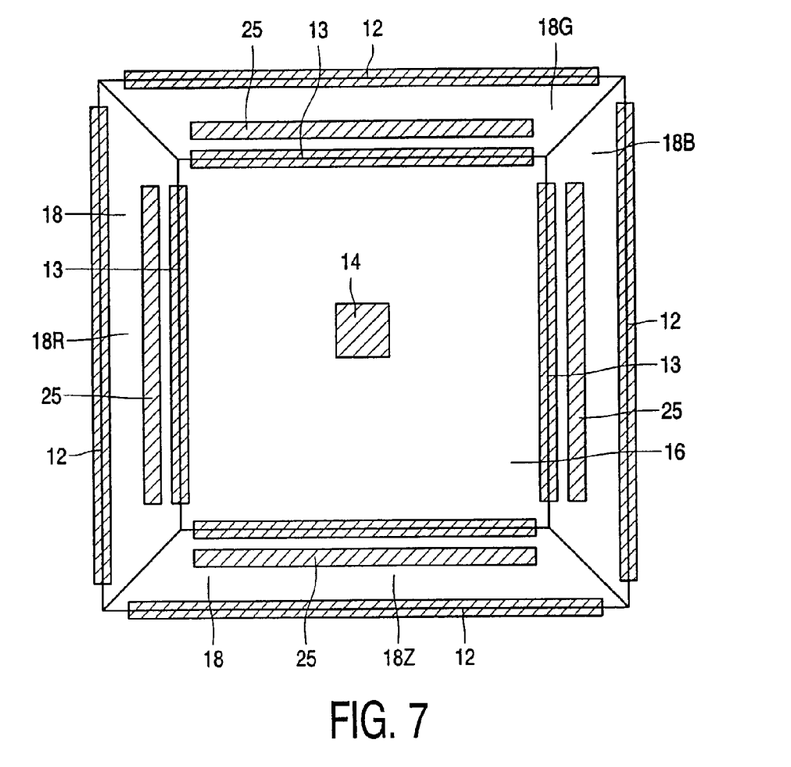
FIG. 7 is a plan view of a variant of FIG. 5.

The process may be accelerated by using a plan view again, which is comparable to that of FIG. 2, and by extending the display cell shown by the entrance electrodes 25 as shown in FIG. 7. All auxiliary reservoirs 18, 18R, 18G, 18B now comprise red, green, blue (and possibly black) particles. The color selection and subsequent adjustment of the grey value may now, however, take place simultaneously for the three (four) types of particles (colors). The reference numerals have the same significance as in the previous examples.

The devices shown in FIGS. 5, 6, 7 are notably particularly suitable for display devices based on the colors of yellow, cyan and magenta (subtractive color mixing).

FIG. 8 is a cross-section of a further color display cell according to the invention. An auxiliary reservoir 18, now situated underneath the main reservoir 16, is filled again with an electrophoretic medium, for example, a white liquid in which electrophoretic particles 22, in this example colored positively charged particles, are present, which consist of red particles 22R, green particles 22G and blue particles 22B. Not only do the particles have a different color in this example, but also a difference of mobility. For example, the red particles move faster in an electric field than the green ones and these in turn move faster than the blue ones.

Figure 8A:
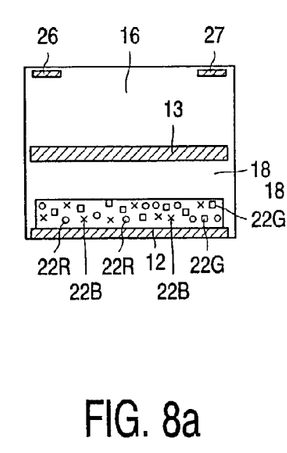
FIG. 8 shows another principle with which different colors can be realized in a color display device according to the invention.
Figure 8B:
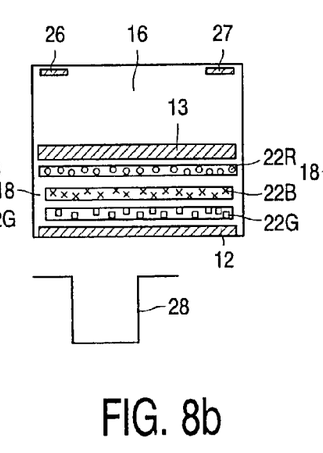
Figure 8C:
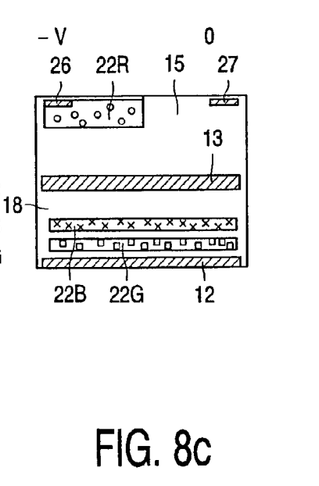

In the situation of FIG. 8a, all particles are present near the electrode 12 (it has a potential of 0, while electrode 13 has a potential of +V). The pixel therefore has a white appearance. In FIG. 8b, the electrode 13 receives a negative pulse (square-wave voltage) 28 with an amplitude of −V which lasts long enough to cause all of the red particles 22R to move towards the electrode 13. The blue particles 22B have covered, for example, half the distance between the electrodes 12, 13. By subsequently presenting voltages 0, −V to the electrodes 27, 26 (FIG. 8c), the red particles 22R predominantly move towards the electrode 16 and a grey value is introduced for red again. Dependent on the voltages at the electrodes 27, 26, different grey values are adjusted.

In a display device having three such pixels, the negative pulse (square-wave voltage) 28 with an amplitude of −V is applied during the double period if a blue color is desired at a mobility of the blue particles which is approximately half that of the red particles. All of the red and blue particles are then situated at the location of the electrode 13. Subsequently, the electrode 13 receives a positive pulse (square-wave voltage) with an amplitude of +V which lasts long enough to cause all of the red particles 22R to move away from the electrode 13. By subsequently presenting voltages to the electrodes 27, 26, the blue particles move towards the electrodes 26, 27 and a grey value is introduced again. Similar pulse patterns provide the possibility of adjusting a grey value for a blue pixel. The auxiliary reservoir may be common again for a plurality of pixels.

Figure 9:
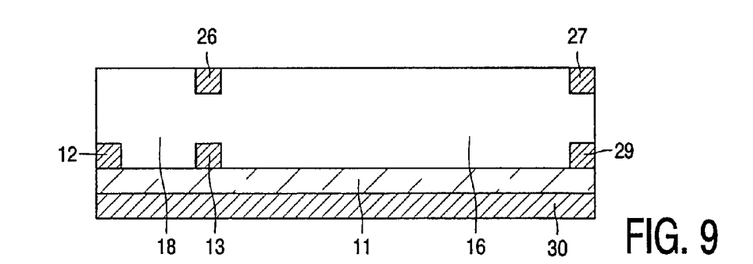

FIG. 9 is a cross-section of a pixel which works on the basis of the principle described above. The auxiliary reservoir 18 is present between the electrodes 12, 13. Similarly as described with reference to FIG. 8, particles of a given color are selected which are situated at the location of the electrode 14 after selection. By means of a suitable negative voltage at electrode 29, the particles are introduced into the main reservoir 16. Since the particles do not always remain positioned on the substrate, for example, due to motion in the liquid, it may be advantageous again to provide it with a sticking layer having a small adhesion so as to spread the particles uniformly across the substrate 11. The uniform spread of the particles across the substrate 11 may also be obtained by means of a small alternating voltage at an extra electrode 30 (which may be common for a plurality of pixels).

Subsequently, a grey value is adjusted again via electric voltages at the electrodes 26, 27 (possibly in combination with a voltage at electrode 30). If necessary, the grey values thus adjusted may subsequently be fixed again by means of a magnetic field or by an electric field in a direction transverse to the substrates. By means of voltages at the electrode 13, particles of a different color are prevented from reaching the main reservoir 16.

Figure 10:
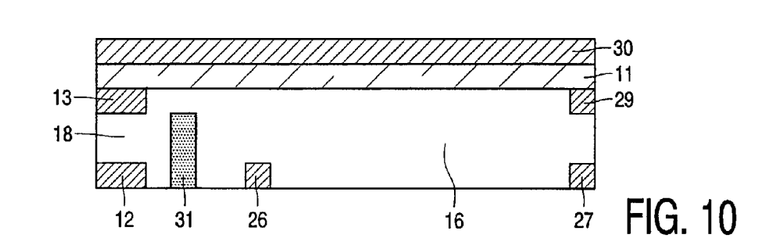
FIG. 10 shows a variant of the display device of FIG. 9.
Figure 11A:
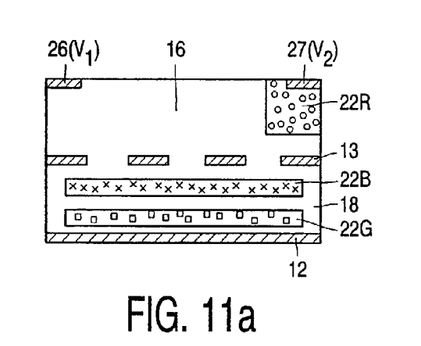
FIG. 11 shows another electrophoretic color display device according to the invention.
Figure 11B:
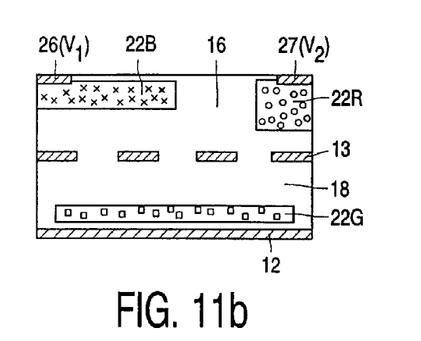
Figure 11C:
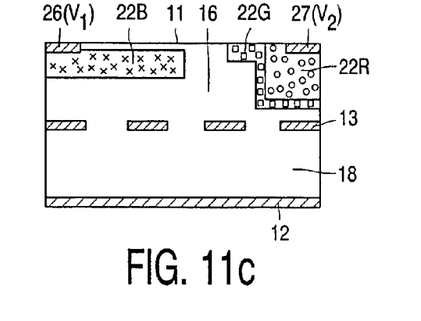
Figure 11D:
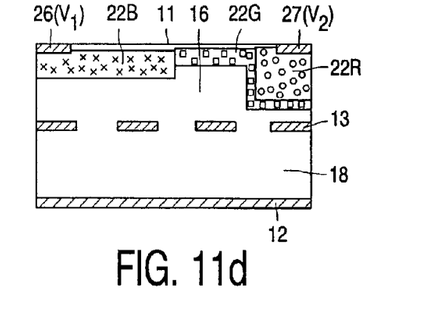

In the device of FIG. 10, the latter is achieved by means of a barrier 31 of, for example, an organic (polymer) or inorganic (glass frit) material. The electrode 13 is now present in the auxiliary reservoir 18. The reference numerals again have the same significance as in the previous example. In the examples of FIGS. 8, 9, electrode 29 may be omitted, if necessary. This requires different drive patterns on the electrodes 26, 27, 30 so as to generate the desired attracting field, while, moreover, electrodes 27, 30 are provided on the other sides of the pixel.

FIG. 11 shows how a multicolor pixel, comparable with that of FIG. 8, can be driven. After substantially all of the red particles 22R are moved by means of, for example, a negative pulse again (square-wave voltage) with an amplitude which lasts sufficiently long to move all of them towards the electrode 13, the red particles are moved mainly towards the electrode 27 (see FIG. 11a) by means of voltages V1, V2 at the electrodes 26, 27, at which V2 is V2>>V1. The blue particles 22B are present near or just underneath the electrode 13, dependent on the mobility and the voltage at electrode 13. After all of the particles have moved towards electrode 13, blue particles 22B are moved mainly towards the electrode 26 by means of voltages V2, V1, in which V2<V1. Only the green particles 22G (see FIG. 11b) are then still present in the auxiliary reservoir. Dependent on the voltages V1, V2 at the electrodes 26, 27, a final situation is reached in which the substrate 11 is covered entirely (see FIG. 11c) or completely (see FIG. 11d) with colored particles 22. The ultimate color and grey value of course also depend on the voltages and pulse widths used for the electrodes 26, 27.

The invention is of course not limited to the examples described hereinbefore. The examples above refer to red, green and blue colors for the sub-pixels, while, as already stated, excellent results can also be obtained with the colors of yellow, cyan and magenta, while a fourth (for example, black) element can be added. The invention is also applicable to display devices with two colors (monochrome, for example, black and white).

Since the auxiliary reservoirs do not belong to the actual pixels, they are preferably covered with an opaque (black) mask. The edges of one or a group of pixels then preferably coincide with walls 19 of the combined reservoirs (capsules). This prevents crosstalk between juxtaposed pixels because a complete separation between the reservoirs (capsules) is realized.

A combination of one or more of these possibilities is also applicable in practice.

The protective scope of the invention is not limited to the embodiments described.

The invention resides in each and every novel characteristic feature and each and every combination of characteristic features. Reference numerals in the claims do not limit their protective scope. Use of the verb "comprise" and its conjugations does not exclude the presence of elements other than those stated in the claims. Use of the article "a" or "an" preceding an element does not exclude the presence of a plurality of such elements.

The invention claimed is:

1. An electrophoretic display device comprising:
at least a pixel with an electrophoretic medium in a main reservoir;
a first electrode,
means via which the pixel can be brought to different optical states, the pixel further comprising,
at least one auxiliary reservoir,
a second electrode,
drive means for displacing electrophoretic particles from the auxiliary reservoir into the main reservoir via electric voltages, and
means for generating an electric field transverse to the direction of displacement of the electrophoretic particles between the main reservoir and the at least one auxiliary reservoir, wherein a barrier between the main reservoir and the auxiliary reservoir is provided.

2. An electrophoretic display device as claimed in claim 1, wherein the pixel comprises electrodes and means for applying a voltage to the electrodes for the purpose of separating an auxiliary reservoir from the main reservoir or separating the auxiliary reservoirs from each other.

3. An electrophoretic display device as claimed in claim 1, wherein, viewed transversely to the display device, at least parts of the edges of one or more pixels coincide with walls enclosing at least a main reservoir and an auxiliary reservoir.

4. An electrophoretic display device as claimed in claim 1, wherein the display device comprises means for bringing the pixel to a defined state prior to selection.

5. An electrophoretic display device as claimed in claim 1, wherein the main reservoir comprises at least one further electrode, and the drive means realize intermediate optical states via electric voltages.

6. An electrophoretic display device as claimed in claim 5, wherein, viewed from a direction transverse to a main surface of the display device, the pixel comprises auxiliary reservoirs along at least two sides of the main reservoir.

7. An electrophoretic display device as claimed in claim 5, for multicolor display, provided with means for selectively displacing electrophoretic particles from an auxiliary reservoir to the main reservoir.

8. An electrophoretic display device as claimed in claim 7, wherein the auxiliary reservoir is common for electrophoretic particles having a different mobility.

9. An electrophoretic display device as claimed in claim 7, wherein the auxiliary reservoirs are common for two juxtaposed pixels.

10. An electrophoretic display device as claimed in claim 5, comprising means for fixing the electrophoretic particles.

11. An electrophoretic display device as claimed in claim 10, provided with means for generating an electric field transverse to the direction of displacement of the electrophoretic particles between the main reservoir and an auxiliary reservoir.

12. An electrophoretic display device as claimed in claim 10, wherein the electrophoretic particles and at least a wall of the main reservoir have a capability of mutual adhesion.

13. An electrophoretic display device as claimed in claim 5, provided with means for impeding the displacement of the electrophoretic particles between the main reservoir and an auxiliary reservoir for at least a part of the electrophoretic particles.

14. An electrophoretic display device as claimed in claim 13, for multicolor display, wherein electrophoretic particles can be selectively displaced from the auxiliary reservoir to the main reservoir.

15. An electrophoretic display device as claimed in claim 5, wherein, viewed from a direction transverse to a main surface of the pixel, the auxiliary reservoir is situated behind the main reservoir.

16. An electrophoretic display device as claimed in claim 1, wherein the barrier is the transverse electric field.

* * * * *